(12) United States Patent
Siebert

(10) Patent No.: US 7,743,551 B2
(45) Date of Patent: Jun. 29, 2010

(54) PEST CONTROL APPARATUS AND SYSTEMS

(76) Inventor: Dennis Siebert, 450 11th Ave. S., South St. Paul, MN (US) 55075

( * ) Notice: Subject to any disclaimer, the term of this patent is extended or adjusted under 35 U.S.C. 154(b) by 173 days.

(21) Appl. No.: 11/767,809

(22) Filed: Jun. 25, 2007

(65) Prior Publication Data

US 2008/0313951 A1  Dec. 25, 2008

(51) Int. Cl.
*A01M 23/00* (2006.01)
*A01M 1/14* (2006.01)

(52) U.S. Cl. ............................................ 43/114; 43/58

(58) Field of Classification Search ................. 43/114, 43/58, 60, 61, 64–67
See application file for complete search history.

(56) References Cited

U.S. PATENT DOCUMENTS

| | | | | |
|---|---|---|---|---|
| 86,175 A * | 1/1869 | Merritt | ............ | 43/60 |
| 129,415 A * | 7/1872 | Lowrance | ............ | 43/67 |
| 233,853 A * | 11/1880 | Heafer | ............ | 43/66 |
| 253,907 A * | 2/1882 | Andre | ............ | 43/61 |
| 428,966 A * | 5/1890 | Shaw | ............ | 43/61 |
| 1,397,384 A * | 11/1921 | Nagayama | ............ | 43/61 |
| 1,685,241 A * | 9/1928 | Northrup | ............ | 43/114 |
| 2,065,047 A * | 12/1936 | Buford | ............ | 43/113 |
| 2,108,599 A * | 2/1938 | Eiane | ............ | 43/107 |
| 2,153,713 A * | 4/1939 | Eiane | ............ | 43/107 |
| 2,178,789 A * | 11/1939 | Heath | ............ | 43/66 |
| 2,225,251 A * | 12/1940 | Andrick | ............ | 43/61 |
| 2,478,605 A * | 8/1949 | Symens | ............ | 43/61 |
| 2,481,907 A * | 9/1949 | Cook | ............ | 43/67 |
| 2,510,168 A * | 6/1950 | Caldwell et al. | ............ | 43/61 |
| 2,787,082 A * | 4/1957 | Paschen | ............ | 43/66 |
| 2,813,369 A * | 11/1957 | Thomisee | ............ | 43/61 |
| 2,962,836 A * | 12/1960 | Hughes | ............ | 43/114 |
| 3,398,478 A * | 8/1968 | Pearsall | ............ | 43/114 |
| 3,585,750 A * | 6/1971 | Routt | ............ | 43/61 |
| 3,911,612 A * | 10/1975 | Sorenson et al. | ............ | 43/107 |
| 3,913,259 A * | 10/1975 | Nishimura et al. | ............ | 43/114 |
| 3,975,857 A * | 8/1976 | Branson et al. | ............ | 43/61 |
| 3,991,508 A * | 11/1976 | Petrosky | ............ | 43/66 |
| 4,031,654 A * | 6/1977 | Gray | ............ | 43/114 |
| 4,044,495 A * | 8/1977 | Nishimura et al. | ............ | 43/114 |
| 4,144,667 A * | 3/1979 | Souza | ............ | 43/61 |
| 4,157,628 A * | 6/1979 | Saslove | ............ | 43/65 |
| 4,158,929 A * | 6/1979 | Custard | ............ | 43/61 |
| 4,161,079 A * | 7/1979 | Hill | ............ | 43/114 |
| 4,187,634 A * | 2/1980 | Kintz | ............ | 43/61 |
| 4,205,480 A * | 6/1980 | Gartner | ............ | 43/98 |

(Continued)

FOREIGN PATENT DOCUMENTS

DE    19954142 A1 *  5/2001

(Continued)

*Primary Examiner*—Darren W Ark
(74) *Attorney, Agent, or Firm*—Schwegman, Lungberg & Woessner, P.A.

(57) ABSTRACT

Apparatus and systems to control pest populations are described herein. In one example, the apparatus may include an enclosure comprising two sides and a top having an opening is configured to receive a transparent panel. In another example, a pest trap system includes an enclosure which defines a pest traversal path, an adhesive on a portion of that path, and an aerial travel blocker to prevent a pest from traveling above the adhesive.

20 Claims, 3 Drawing Sheets

U.S. PATENT DOCUMENTS

| | | | | |
|---|---|---|---|---|
| 4,217,722 A * | 8/1980 | McMullen | | 43/114 |
| 4,244,134 A * | 1/1981 | Otterson | | 43/114 |
| 4,385,465 A * | 5/1983 | Palmeri | | 43/114 |
| 4,557,067 A * | 12/1985 | Ha | | 43/61 |
| 4,583,317 A * | 4/1986 | Beard | | 43/61 |
| 4,590,703 A * | 5/1986 | Cutter | | 43/61 |
| 4,603,504 A * | 8/1986 | Llanos | | 43/65 |
| 4,709,503 A * | 12/1987 | McQueen | | 43/114 |
| 4,709,504 A * | 12/1987 | Andric | | 43/114 |
| 4,769,942 A * | 9/1988 | Copenhaver, Sr. | | 43/61 |
| 4,782,620 A * | 11/1988 | Syszczyk et al. | | 43/61 |
| 4,815,231 A * | 3/1989 | McQueen | | 43/114 |
| 4,819,371 A * | 4/1989 | Cohen | | 43/114 |
| 4,829,700 A * | 5/1989 | Ha | | 43/61 |
| 5,094,027 A * | 3/1992 | Smotherman | | 43/65 |
| 5,148,625 A * | 9/1992 | Saleman | | 43/61 |
| 5,175,956 A * | 1/1993 | Hover et al. | | 43/114 |
| 5,299,380 A * | 4/1994 | Fornal, Sr. | | 43/66 |
| 5,345,710 A * | 9/1994 | Bitz | | 43/61 |
| 5,367,820 A * | 11/1994 | Lafforthun | | 43/61 |
| 5,398,442 A * | 3/1995 | Musket | | 43/114 |
| 5,438,792 A * | 8/1995 | Monett et al. | | 43/114 |
| 5,454,186 A * | 10/1995 | Gang | | 43/114 |
| 5,497,576 A * | 3/1996 | Nowak | | 43/114 |
| 5,588,250 A * | 12/1996 | Chiba et al. | | 43/114 |
| 5,673,509 A * | 10/1997 | Gatewood, Jr. | | 43/114 |
| 5,682,705 A * | 11/1997 | Stahl | | 43/61 |
| 5,713,153 A * | 2/1998 | Cook et al. | | 43/114 |
| 5,720,125 A * | 2/1998 | Oviatt | | 43/61 |
| 5,809,688 A * | 9/1998 | Wallen | | 43/61 |
| 5,930,944 A * | 8/1999 | Knuppel | | 43/114 |
| 5,979,105 A * | 11/1999 | Marks | | 43/66 |
| D423,631 S * | 4/2000 | Shultz | | D22/119 |
| 6,178,686 B1 * | 1/2001 | Batman | | 43/61 |
| 6,202,339 B1 * | 3/2001 | Knuppel | | 43/114 |
| 6,202,340 B1 * | 3/2001 | Nieves | | 43/61 |
| 6,263,612 B1 * | 7/2001 | Shultz | | 43/61 |
| 6,266,917 B1 * | 7/2001 | Hight | | 43/114 |
| 6,389,738 B1 * | 5/2002 | Denny et al. | | 43/58 |
| 6,442,889 B1 * | 9/2002 | Lee | | 43/114 |
| 6,588,141 B1 * | 7/2003 | Bergeson | | 43/58 |
| 6,684,560 B2 * | 2/2004 | Lafforthun | | 43/61 |
| 6,775,947 B2 * | 8/2004 | Anderson et al. | | 43/61 |
| 6,796,081 B2 * | 9/2004 | Anderson et al. | | 43/98 |
| 6,990,767 B1 * | 1/2006 | Margalit | | 43/61 |
| 7,051,472 B1 * | 5/2006 | Kelly | | 43/61 |
| 7,540,109 B2 * | 6/2009 | Hall | | 43/61 |
| 2001/0017001 A1 * | 8/2001 | Leverton | | 43/58 |
| 2004/0216368 A1 * | 11/2004 | Simpson et al. | | 43/114 |
| 2005/0097808 A1 * | 5/2005 | Vorhies et al. | | 43/61 |
| 2006/0283075 A1 * | 12/2006 | Feldhege et al. | | 43/114 |
| 2007/0011942 A1 * | 1/2007 | Hawkins, Jr. | | 43/114 |

FOREIGN PATENT DOCUMENTS

| | | | |
|---|---|---|---|
| FR | 2614179 A1 * | 10/1988 |
| JP | 07170896 A * | 7/1995 |
| JP | 08051910 A * | 2/1996 |
| JP | 09275879 A * | 10/1997 |
| JP | 09322685 A * | 12/1997 |
| JP | 2000270753 A * | 10/2000 |
| JP | 2001037399 A * | 2/2001 |
| JP | 2001231428 A * | 8/2001 |
| JP | 2003033132 A * | 2/2003 |
| JP | 2003189780 A * | 7/2003 |
| JP | 2006254923 A * | 9/2006 |
| JP | 2008022730 A * | 2/2008 |
| JP | 2008237071 A * | 10/2008 |
| WO | WO 9310661 A1 * | 6/1993 |

* cited by examiner

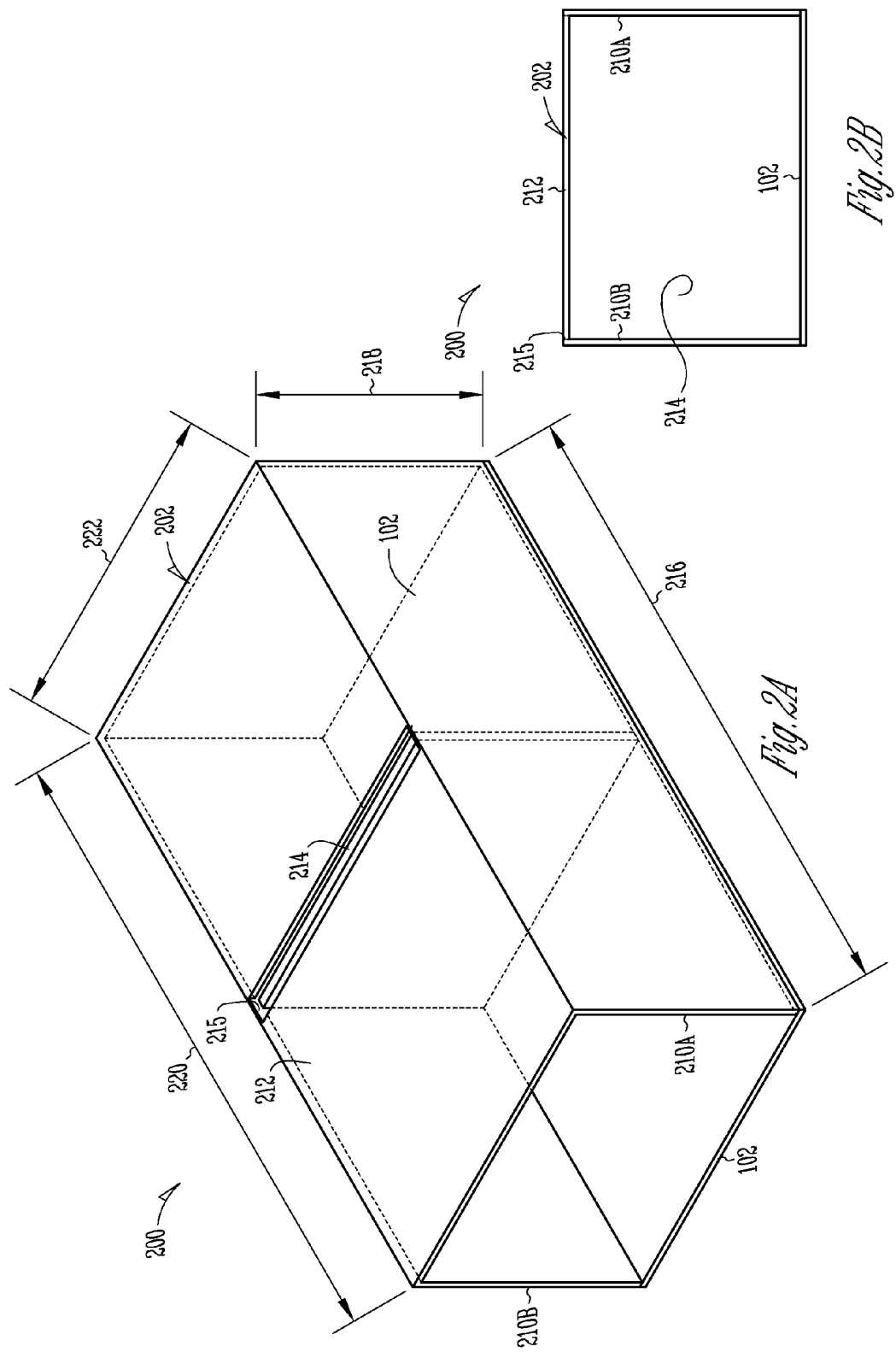

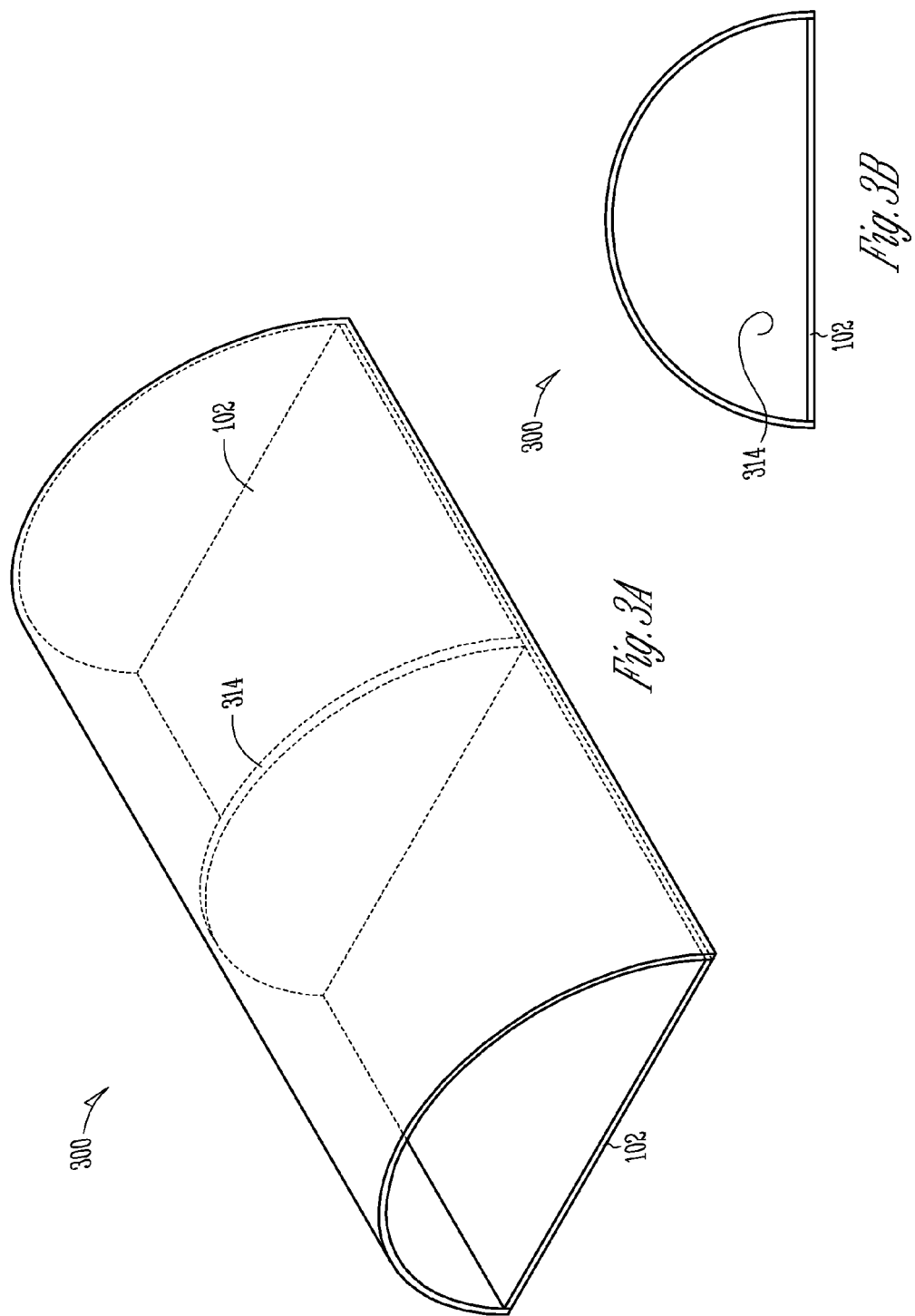

PEST CONTROL APPARATUS AND SYSTEMS

TECHNICAL FIELD

This application relates to apparatus for pest control and more particularly to rodent control apparatus and systems.

BACKGROUND

Control of another species that is deemed detrimental to the health, ecology, or economy is collectively known as pest control. Pest control has been employed since the early days of organized agriculture as the human species transitioned from hunter/gatherers to an agricultural or pastoral society. Within agricultural disciplines, pest control may be restricted to natural, or holistic, methods, such as crop rotation, companion planting and selective breeding. It may also include artificial means, such as use of pesticides, or other active methods.

Pest control, however, is not restricted to the growth of food crops. It also includes within homes or towns. For instance, seagulls at seaside resorts have expanded their populations to such an alarming degree that they are now acting with aggression towards the very tourists that have been feeding them for years. Within our homes, the variety of pests that impact us is virtually endless. Termites, ants, rodents, bats, etc. are battled against daily by homeowners. In some instances, homeowners have turned to professional pest control specialists. In all instances, though, some measure of pest control should be employed by every homeowner to avoid the encroachment of undesirable species upon the tranquility of their homes.

BRIEF DESCRIPTION OF DRAWINGS

Embodiments are illustrated by way of example and not limitation in the figures of the accompanying drawings, in which like references indicate similar elements and in which:

FIG. 2A shows a cross-sectional diagram of a pest control apparatus, in accordance with an example embodiment;

FIG. 2B shows a front elevation of a pest control apparatus, in accordance with an example embodiment;

FIG. 3A shows a cross-sectional diagram of a pest control apparatus, in accordance with an example embodiment; and FIG. 3B shows a front elevation of the pest control apparatus of FIG. 3B, in accordance with an example embodiment.

DETAILED DESCRIPTION

Figure 1:
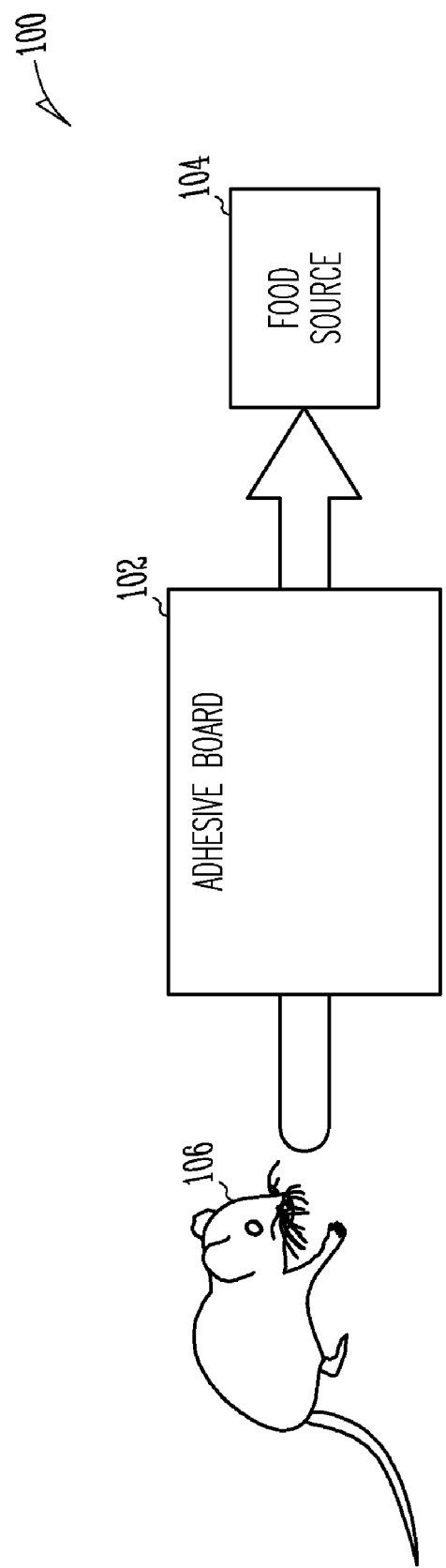
FIG. 1 shows an example arrangement of a pest control system, in accordance with an example embodiment of the present invention.

In the following detailed description of example embodiments, reference is made to the accompanying drawings, which form a part hereof and in which is shown, by way of illustration, specific embodiments in which the example method, apparatus, and system may be practiced. It is to be understood that other embodiments may be utilized and structural changes may be made without departing from the scope of this description.

Overview

The present application provides an apparatus, in some embodiments, that has increased efficacy in the reduction of a rodent population. The use of a multi-spectrum approach to rodent control is the method most used by professionals in the field, and will typically include more than one apparatus for the reduction in the rodent population. This may include the use of glue-boards, poison, traps, and the like. It may also include apparatus or methods that do not have a direct influence, but indirectly affect the ability of a rodent to infest a dwelling. These may include reduction in the ways that a rodent can access the dwelling, or other deterrents, which by themselves do not directly affect the rodent itself, but prevent to some degree, the rodent from easy access. Though multiple methods and apparatus may be used in practice, the discussion of only one apparatus will be made within made herein. In the interests of simplicity, discussion of controlling the rodent population through this one method will be made, with the understanding, that in practice, other apparatus may be needed to effectively control the population.

FIG. 1 shows an example arrangement of a pest control system, in accordance with an example embodiment of the present invention. The system 100 includes an adhesive substrate, in one example a board, 102 and a food source 104. The food source 104 may be the normal food source for a rodent 106, in one example. In such a case, the adhesive board 102, also known as a glue board, can be placed between the place of origin of the rodent 106 and the food source 104. In another example, the food source 104 may be placed there purposefully to direct the path of the rodent 106 over the adhesive board.

In operation, the adhesive board 102 is adapted, typically through the use of a glue surface, to ensnare the rodent 106 on the surface of the adhesive board 102. Over time, the rodent 106 will starve and expire on the adhesive board 102. The presence of a dead rodent on the board may be a deterrent to other rodents, and regular removal of used glue boards can be employed. One other problem in the practice of adhesive board is the propensity of the glue boards to attract debris and become ineffective, thereby, for their intended purpose. An additional problem in the practice of glue boards has been the unappealable presence of the dead rodent on the glueboard itself. In an early rodent capturing device, U.S. Pat. No. 2,962,836 (hereinafter Hughes), this problem was overcome with an enclosure placed over the actual glueboard. The apparatus in Hughes provided a rodent capturing device that needed little effort on the part of the attendant. More recently, enclosures over glueboards have taken the form of a freestanding structure, as opposed to the integrated enclosure in Hughes, that can be used with any glueboard. This removed a problem inherent in Hughes, in that when the supply of adhesive sheets ran out, the entire structure would be replaced. By using a freestanding structure, the glueboard itself can be replaced with multiple disposable boards without regard to replacing the enclosure itself. However, the enclosure still provides the advantage of hiding the dead rodent from view, and in protecting the glueboard from debris.

Rodents, though, are cagey creatures at times. Limited intellect, notwithstanding, the use of glueboards over time has lead to a rodent innovation of jumping over (aerial traversal) the glue board itself, bypassing all protections and control it provides. Even when using enclosures over the glueboard, the ability of the rodent to jump over the glueboard is leading to decrease efficacy in the employment of this apparatus. In one example, this deficiency may be overcome by the placement of a rodent undetectable panel in the middle of the glueboard. In an example, the panel is essentially transparent. Any rodent jumping over the glue board would violently encounter the panel, and be stunned. They would then be ensnared by the adhesive itself and subsequently die.

Systems

FIG. 2A shows a cross-sectional diagram of a pest control apparatus, in accordance with an example embodiment. The pest control apparatus 200 includes an enclosure 202 that is adapted to be placed over an adhesive board (substrate) 102, or glue board. As shown in FIG. 2A, the enclosure 202 would preferably be of dimensions sufficient to completely enclose the glue board itself. However, in some examples, the enclosure may have been of slightly smaller dimensions than the glueboard. The effectiveness of the present innovation would not be decreased, except that the path through which the rodent must travel to be captured would be smaller. The enclosure 202 comprises, two sides 210a 210b and a top 212. The top 212 includes an opening 215 in the middle of the enclosure that can receive and secure a transparent panel 214. This transparent panel provides an impenetrable barrier to the rodent. The panel is undetectable by, e.g., essentially transparent to, the rodent or pest to be trapped in the pest control apparatus.

Each of the sides 210a 210b have similar length 216 and height dimensions 218, as well as some nominal depth dimension. The top 212 has a length dimension 220 that is similar to the length dimension of the sides 210a 210b such that it completely covers the entire length of the two sides. The top additionally has a width dimension 222, which separates the two sides 210a 210b so that when coupled together, the sides and the top provide a path through which the rodent can pass. Additionally the top may have a nominal depth dimension. In the configuration depicted in FIG. 2A, the enclosure is rectangular in shape when viewed from the front, or a vertically planar elevation. The present application is not limited to a rectangle, as in practice the height and width dimensions may be similar enough as to provide a square vertical planar elevation.

The opening on the top of the enclosure would receive a transparent panel, therein providing an impenetrable barrier to the rodent. The transparent panel may be constructed of any suitable material, provided that the material allows the passage of light and images in sufficient detail so that the rodent would not be aware of a physical barrier interposed between the ends of the enclosure. This may include, without limitation, glass, plexiglas, transparent plastic, and the like. The transparent panel would include a width dimension similar to the width dimension of the top of the enclosure and a height dimension that is similar to the height dimension of the sides of the enclosure. In one example, this provides complete coverage through the width and height of the enclosure. In some examples, the height dimension may be slightly greater than that of the enclosure. This may useful when interchanging panels between different enclosures. The opening through which the panel is received and, in some examples, secured, is disposed intermediately in the enclosure and oriented perpendicular to a longitudinal axis of the enclosure. Through this positioning, the greatest coverage across the enclosure can be obtained with the least amount of material. Additionally, it may provide strength. One further advantage of such an arrangement, is that a panel that is not perpendicular to the enclosure may provide only a glancing blow to the rodent, which may only stun the animal momentarily such that they could still escape. A perpendicular arrangement provides the greatest chance that the rodent is more than just temporarily stunned so that the effectiveness of the adhesive is increased and the chances of ensnaring the rodent are increased.

In one example, the transparent panel is removably secured to the enclosure. Through such functionality, the panel could be cleaned or replaced easily. In an alternate example, the panel would be permanently secured to the enclosure. In such an arrangement, the enclosure and the panel would be manufactured and assembled together and delivered as one product. Through this functionality, ongoing handling is decreased, which may be desirable when the enclosure is deployed and maintained by a non-professional.

FIG. 2B shows a front elevation of a pest control apparatus, in accordance with an example embodiment. The front elevation of the pest control apparatus 200 shows the view experienced by a rodent as they look towards the enclosure. As discussed above, the transparent panel would completely fill the cross section of the enclosure but be constructed of a material that renders it essentially invisible to the rodent. The rodent not noticing the panel, would launch themselves from a position short of the adhesive board with the intention of reaching the other side of the adhesive board, avoiding entirely the board, or possibly landing on the very edge. In the latter example, they would retain sufficient momentum such that they would not be ensnared by the glue board in the absence of the transparent panel. Using the transparent panel as a barrier, the launched rodent would violently strike the panel, be rendered senseless for a time period sufficient to be ensnared by the adhesive.

FIG. 3A shows a cross-sectional diagram of a pest control apparatus 300, in accordance with an example embodiment. The apparatus depicted in FIG. 3A is an alternate arrangement of the enclosure depicted and described above. As discussed above, the enclosure may be rectangular or square in cross-section. However, the present application is not limited to such an arrangement, and may include an enclosure with a semi-elliptical vertical planar cross-section.

In the example of FIG. 3A, the enclosure includes a length dimension and a width dimension. The enclosure is one structure, in an example. One advantage of such construction is that the middle of the enclosure may have a height that is significantly higher that that of a rectangular enclosure constructed of the same amount of material. This may provide to the rodent, in their limited mind, a greater chance of clearing the entire length of the glue board in a single leap.

In this example, the transparent panel 314 would have a vertical planar cross-section similar to that of the enclosure itself. Again, this provides complete coverage across the entire cross section of the enclosure. The transparent panel would be received into an opening in the enclosure. The opening is disposed intermediately on the longitudinal axis of the enclosure and oriented perpendicular to the longitudinal axis.

FIG. 3B shows a front elevation of the pest control apparatus 300 of FIG. 3A, in accordance with an example embodiment. Similar to FIG. 2B above, FIG. 3B shows the view experienced by a rodent as they look towards the enclosure of FIG. 3A. In this example, the rodent may be more apt to try and clear the length of the adhesive board due to the extra height afforded by the semi-elliptical construction of this enclosure. However, just as discussed above, the rodent would violently strike the transparent panel, and be more susceptible to being ensnared by the adhesive board.

In use, either the enclosure in FIG. 2A or 3A is placed over an adhesive board. Alternatively, the adhesive board may be an integral part of the enclosure. In the example above with the removably secured transparent panel, the enclosure would first be installed over the adhesive board, and the panel placed within the opening such that the entire cross section of the enclosure is covered. In the example of the permanently secured transparent panel, the enclosure would already contain the panel and all the installation required would be the placement of the enclosure on the adhesive board.

In practical use, the enclosure, including the transparent panel, would be placed along a high traffic area for the rodent. Typically, rodents will travel a predictable path between where they sleep and where they feed, or where they could possibly feed. Though knowledge of this path would increase the effectiveness of the apparatus described herein, such knowledge is not absolutely required. Any professional knowledgeable in this field will be able to, through experience, determine the likely paths the rodents will travel. The enclosure, containing the transparent panel, would be left in place, and periodically checked for the presence of an ensnared rodent. If a rodent has been ensnared, the enclosure can be replaced after the rodent has been removed, or just the rodent removed. Depending on the force of the impact of the rodent on the panel, the panel may itself have become clouded or obscured. It can be advantageous to inspect the panel and replace it in such an occurrence, as a clouded or otherwise obscured panel may alert the rodent.

In one example, the enclosure, the adhesive board and the transparent panel are three distinct elements. Each of these elements may have some utility by themselves, but in combination they operate for a greater purpose than just the combination of those parts. The adhesive board, by itself, merely ensnares rodents, but leaves the dead rodent in full view. The enclosure, used with the adhesive board, does nothing more than obscure the dead rodent, in that instance. The enclosure may have additional utility, as discussed above, for keeping the adhesive board clear of debris. The panel, operating by itself, would do no more than create a barrier that the rodent would avoid by walking around it. The panel may have some utility placed on the adhesive board, but without the inclusion of the enclosure in which it is placed, the panel may be dislodged easily. This may be due to a rodent striking it so hard as to knock it over. In which case, the stunned rodent, would not be ensnared by the adhesive board, and be left to recover and move on towards their food source. Alternatively, the panel may be jumped over. The combination with the enclosure creates a very useful device for rodent control. The enclosure creates a definable space through which the rodent must travel, and the panel provides a barrier to the rodent, which increases the ability of the adhesive board to ensnare the rodent. In the case of a jumping rodent, the violent strike of the rodent on the panel adds more utility to the adhesive board.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A pest control system comprising:
    an adhesive substrate including an exposed glue surface having a width and a length, the glue surface operable to ensnare a rodent;
    an essentially transparent panel having a vertical planar cross-section that is perpendicular to and over the glue surface at approximately a middle of the glue surface relative to a longitudinal axis of the adhesive substrate, and having a panel lateral dimension parallel to the width of the glue surface that is substantially as great as the width of the glue surface, the essentially transparent panel extending from the glue surface to a height, a majority of the essentially transparent panel being both substantially solid throughout and without any openings therethrough, the essentially transparent panel operable as an impenetrable barrier to the rodent.

2. The pest control system of claim 1, further including:
    an enclosure adapted to be placed over the adhesive substrate, the enclosure comprising:
        two sides, each of the two sides having a side height dimension and a side length dimension;
        a top with a length dimension similar to the side length dimension and a width dimension, wherein the top has an opening disposed intermediately in the top relative to a longitudinal axis of the top and oriented perpendicular to the longitudinal axis of the top;
        wherein the essentially transparent panel includes a height dimension for the height that is similar to the side height dimension and a width dimension for the panel lateral dimension that is similar to the top width dimension,
    wherein the opening is to receive the essentially transparent panel to provide a transparent barrier at approximately the middle of the glue surface.

3. The apparatus of claim 1, wherein the essentially transparent panel extends from the top to the adhesive substrate.

4. The apparatus of claim 3, wherein the essentially transparent panel includes an edge that is adhered to the adhesive substrate.

5. The apparatus of claim 1, wherein the enclosure includes an enticement to the rodent.

6. The apparatus of claim 5, wherein the enticement includes food.

7. The apparatus of claim 1, wherein the essentially transparent panel includes a material selected from a group consisting of polymer and glass.

8. The pest control system of claim 1, further including:
    means for securing the essentially transparent panel.

9. The pest control system of claim 1, wherein the essentially transparent panel is constructed of plexiglas.

10. An apparatus providing pest control, the apparatus comprising:
    an adhesive substrate including an exposed glue surface having a width and a length, the glue surface operable to ensnare a rodent;
    an essentially transparent panel having a vertical planar cross-section that is perpendicular to and over the glue surface at approximately a middle of the glue surface relative to a longitudinal axis of the adhesive substrate, and having a panel lateral dimension parallel to the width of the glue surface that is substantially as great as the width of the glue surface, the essentially transparent panel extending from the glue surface to a height, a majority of the essentially transparent panel being both substantially solid throughout and without any openings therethrough, the essentially transparent panel operable as an impenetrable barrier to the rodent;
    an enclosure adapted to be placed over the adhesive substrate, the enclosure comprising:
        two sides with similar height and length dimensions;
        a top with a top length dimension similar to the side length dimensions and a top width dimension, wherein the top has an opening disposed intermediately along and oriented perpendicular to a longitudinal axis of the top; and
        the essentially transparent panel removably disposed intermediately within the enclosure and oriented perpendicular to a longitudinal axis of the enclosure, wherein the panel lateral dimension is similar to that of the top width dimension, and is configured to fill an internal width dimension of the enclosure, and the essentially transparent panel having a height dimension for the height that is similar to the height dimensions of the two sides and is configured to fill an internal height dimension of the enclosure.

11. The apparatus of claim 10, wherein the essentially transparent panel includes a material selected from a group consisting of polymer and glass.

12. The apparatus of claim 10, wherein the enclosure includes an entrance on one side of the essentially transparent panel and food on the other side of the essentially transparent panel.

13. The apparatus of claim 10, wherein the essentially transparent panel is constructed of at least one of the following: glass, or plastic.

14. The apparatus of claim 10, wherein the essentially transparent panel is constructed of plexiglas.

15. A method comprising:
providing an adhesive substrate including an exposed glue surface having a width and a length, the glue surface operable to ensnare a rodent;
providing an essentially transparent panel having a vertical planar cross-section that is perpendicular to and over the glue surface at approximately a middle of the glue surface relative to a longitudinal axis of the adhesive substrate, and having a panel lateral dimension parallel to the width of the glue surface that is substantially as great as the width of the glue surface, the essentially transparent panel extending from the glue surface to a height, and a majority of the essentially transparent panel being both substantially solid throughout and without any openings therethrough, the essentially transparent panel operable as an impenetrable barrier to the rodent;
placing the adhesive substrate and the associated essentially transparent panel along a path used by the rodent;
stunning the rodent attempting to jump over the adhesive substrate due to the rodent impacting the essentially transparent panel; and
ensnaring the stunned rodent on the glue surface of the adhesive substrate.

16. The method of claim 15, further including:
means for removably securing the essentially transparent panel in an opening of an enclosure.

17. The method of claim 15, wherein providing the essentially transparent panel further includes:
providing an enclosure adapted to be placed over the adhesive substrate.

18. The method of claim 17, wherein the enclosure includes:
two sides with similar height and length dimensions;
a top with a length dimension similar to the side length dimensions and a width dimension, wherein the top has an opening disposed intermediately along and oriented perpendicularly to a longitudinal axis of the top;
wherein the essentially transparent panel includes a height dimension for the height that is similar to the side height dimensions and the panel lateral dimension is similar to the top width dimension,
wherein the opening is to receive the essentially transparent panel to provide a transparent barrier at approximately the middle of the glue surface.

19. The method of claim 15, wherein providing the essentially transparent parent includes:
providing an essentially transparent panel comprising plastic.

20. The method of claim 15, wherein providing the essentially transparent parent includes:
providing an essentially transparent panel comprising plexiglas.

* * * * *